United States Patent [19]
Solhjell

[11] Patent Number: 5,908,168
[45] Date of Patent: Jun. 1, 1999

[54] APPARATUS FOR STORING AN INCREASED LENGTH OF CONTINUOUS TAPE MEDIUM IN REELED FORM IN STANDARDIZED HOUSING FORMATS

[75] Inventor: Erik Solhjell, Oslo, Norway

[73] Assignee: Tandberg Data ASA, Oslo, Norway

[21] Appl. No.: 08/940,068

[22] Filed: Sep. 29, 1997

[51] Int. Cl.⁶ .......................... G11B 23/087; G11B 23/04
[52] U.S. Cl. .......................... 242/345; 242/343; 242/347; 242/347.1
[58] Field of Search ................................. 242/345, 345.2, 242/345.3, 347, 347.1, 343; 360/132

[56] References Cited

U.S. PATENT DOCUMENTS

| | | | |
|---|---|---|---|
| 1,244,918 | 10/1917 | Thomas | 242/345 |
| 1,317,404 | 9/1919 | Thomas | 242/345 |
| 3,520,495 | 7/1970 | Sotani | 242/345 |
| 5,224,004 | 6/1993 | Kondo | 360/132 |
| 5,547,142 | 8/1996 | Cheatham et al. | 242/338.1 |

FOREIGN PATENT DOCUMENTS

| | | |
|---|---|---|
| 0 025 914 | 4/1981 | European Pat. Off. |
| 0 150 987 | 8/1985 | European Pat. Off. |
| 0 452 014 | 10/1991 | European Pat. Off. |
| 1141427 | 9/1957 | France . |
| 1 001 013 | 1/1957 | Germany . |
| 30 25 536 | 1/1982 | Germany . |
| 1108198 | 4/1968 | United Kingdom . |

*Primary Examiner*—John Q. Nguyen
*Attorney, Agent, or Firm*—Hill & Simpson

[57] ABSTRACT

An apparatus, such as a cassette or a cartridge, for storing a continuous tape medium in reeled form has first and second hubs contained in a housing having a base, with a continuous tape medium wound on said hubs, with a portion of the tape medium wound on one hub and another portion wound on the other hub. The hubs are respectively mounted on axles allowing rotation of the hubs. The axles are rotatably mounted in a platform which is slideable within an opening in the base of the housing so as to allow the axles to exhibit a translational movement, in tandem, in a direction parallel to the base as the tape medium is transferred between the hubs. As the diameter of reeled tape increases on one of the hubs due to the tape transfer, the platform, and the axles and the hubs, will move in a direction toward the housing sidewall closest to the hub having the smaller amount of tape reeled thereon, thereby increasing the spacing between the other hub and the other sidewall to accommodate the increasing diameter. The movable mounting of the axles and hubs allows significantly more length of tape to be contained in the housing, reeled on the hubs since a larger diameter tape reel can be accommodated when all of the tape is fully wound onto one of the hubs.

11 Claims, 9 Drawing Sheets

APPARATUS FOR STORING AN INCREASED LENGTH OF CONTINUOUS TAPE MEDIUM IN REELED FORM IN STANDARDIZED HOUSING FORMATS

BACKGROUND OF THE INVENTION

1. Field of the Invention

The present invention is directed to an apparatus for storing an increased length of continuous tape medium in reeled form in standardized housing formats, such as dual reel cassettes and cartridges in rectangular format and in quadratic format.

2. Description of the Prior Art

The need for storing all types of information in a digital form is increasing very rapidly. Such information can be all types of computer based/generated data, data generated by document scanners, loggers, various form of video or audio, or a combination of any of these.

Conventionally, computers use magnetic hard disks to store such information which is rapidly required (short retrieval time), while tape is used extensively for backup of such hard disks and also for long term archival storage.

Tape is by far the cheapest high capacity media available today, and the suppliers of tape drives are constantly bringing out new drives with better performance (higher capacity, shorter access time, higher data rates etc.)

Originally, tape drives were based upon the open-reel principle: The tape to be recorded was supplied on one reel which was mounted on the tape drive by the operator. The tape was then guided from the supply reel across the recording head to an empty take-up reel. As the tape drive was running, more and more tape was moved from the supply reel to the take up reel. At the end, the tape was rewound from the take up reel back on to the supply reel. Then the operator could remove the supply reel and replace it with another one.

This system is still in use in some data systems today. The requirement for a trained operator, the size of the supply reel (normally 10 inches or more in diameter), and no protection of the tape when the supply reel was removed from the tape drive, make such open reel systems less attractive today. Instead, manufacturers and users have turned to various forms of cassette and cartridge based tape systems.

There are many tape cassette/cartridges in use today; however, they can typically be categorized into three basic groups: single reel cassette, dual reels cassette, and belt driven cassette or cartridge.

The single reel cassette is really a refined version of the original open-reel system. Well known examples of the single reel cassette, are the IBM 3480 (later enhanced into 3490 and newer models) and the DLT cassette (previously known as the Compact reel). These cassettes are characterized by a square (normally quadratic or close to quadratic) housing containing just one single tape cassette (with tape). During operation, the cassette is inserted in the drive and one end of the tape is automatically pulled out of the cassette and onto a take up reel inside the drive. The operation therefore resembles the old open reel system, except that the tape cassette is physically smaller, and designed so that loading and tape extraction can be done without operator involvement.

These cassettes have an opening on one side of the housing to allow the tape end to be pulled out during insertion into the tape drive. At the bottom of the cassette housing is an opening which allows a drive motor built into the tape drive to engage to the tape reel in the cassette.

These single reel cassettes have increased in popularity during the last few years, because they offer relatively large tape length in a fairly small cassette housing. Also, the cost of building tape drives which can handle such cassettes effectively and reliably has decreased considerably.

Nevertheless, single reel tape cassettes have some basic drawbacks. The most important one is that the tape always needs to be pulled out of the cassette onto the take up reel inside the drive. This requires a fairly sophisticated mechanism, and takes time. Many single reel cassette systems need between 20 and 60 seconds or more just to load the tape properly. This will significantly reduce the effective speed of the system (longer data access time).

Furthermore, if power is lost during operation, it is normally impossible to eject the cassette from the tape drive. For some application and systems, this may be a severe drawback.

Figure 1:
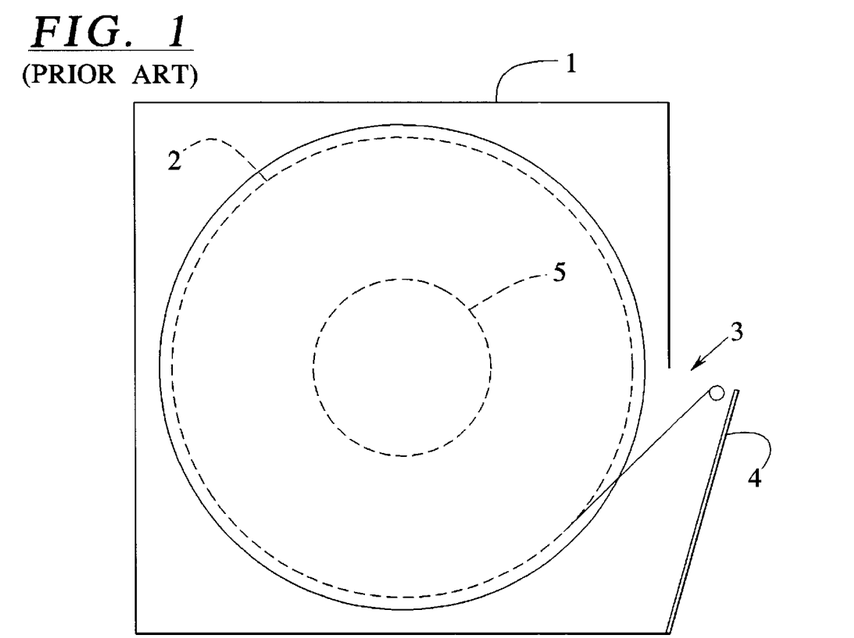
FIG. 1 is a schematic illustration showing the basic structure of a conventional single reel cassette.

FIG. 1 shows the basic principle design of a conventional single reel cassette. The fact that the cassette housing contains only one single reel of tape, makes it possible to achieve a large tape area in a fairly small cassette. In FIG. 1, 1 references the cassette housing. 2 references the tape reel containing the tape wound on hub 5, while 3 references the leader block (the beginning of the tape with a plastic hook that connects to the tape drive). The cassette housing 1 has a door 4 which opens to allow the leader block 3 to be pulled out.

The dual reel cassette is well known in many different versions: 4 mm DAT or DDS cassette, 8 mm videocassette, the Philips audio (Compact) cassette and the VHS video cassette just to name a few.

The principle of the dual reel cassette is that both tape reels are located within the cassette housing. The tape moves from one reel to the other during operations. A portion of the tape housing is typically designed to be opened automatically when the cassette is inserted into the tape drive, thereby exposing the tape. The drive read/write head, tape capstan spindle(s) and drive tape guides can then move into contact with the tape. In some cases, such as the VHS, the 8 mm and the 4 mm cassettes, a section of the tape is actually pulled out of the cassette during insertion into the drive and wrapped partly around the recording heads and over the drive tape guides.

Figure 2:
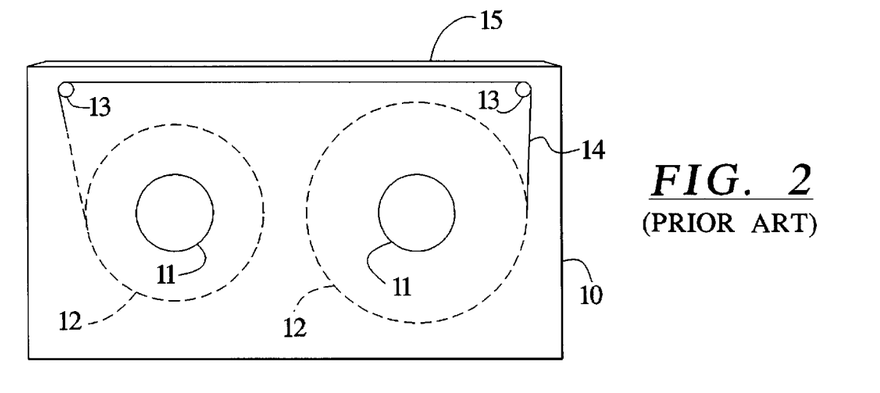
FIG. 2 is a schematic illustration showing the basic structure of a conventional dual reel cassette with fixed-position axles.

Compared with the single reel cassette design, the dual reel cassette normally makes it possible to design a fairly simple drive mechanism, especially if the tape does not need to be partly pulled out of the cassette. Dual reel cassettes have two openings at the bottom where tape drive motors can engage to the tape reels inside the cassette. FIG. 2 shows the basic design principles of a dual reel cassette. A cassette housing 10 contains a tape 14 wound in reels 12 on respective hubs 11. A door 15 which opens during insertion into the drive to expose the front end of the cassette housing 11 and the tape 14.

A drawback of dual reel cassettes is that the there must be room for more than two full tape reels inside the housing. First of all, the distance from each hub to the inside of the cassette housing must at a minimum be equal to the maximum radius of a hub fully loaded with tape (plus a small tolerance/safety factor). Secondly, the distance between the hubs is a function of the diameter of a hub fully loaded with tape. It can be shown that the maximum distance required between the two hubs occurs when both hubs contain equal amount of tape(=half the tape length). If the diameter of a hub loaded with the whole tape length is D, then it can be shown that the minimum length between the two hubs must be D√2 (assuming that the diameter of the empty hub is very small compared to the diameter of the full reel of tape). For example, if the maximum diameter of a full tape reel is 2" (50.8 mm), the minimum inside length of the cassette housing must be 2"+2"+1.4·2"=6.8" (172.7 mm). (As shown later, for practical designs, the distance between the hubs needs to be somewhat longer than the D√2 length, because the diameter of the hub without any tape has to be taken into account).

By definition, within the same form factor, the dual cassette has a capacity for less tape media than a similar single reel cassette with the same form factor.

During recent years, the dual reel cassette has gained in popularity, especially because the mechanical design of the tape drive can be made far simpler and more reliable than for drives utilizing single reel cassettes. The fact that the available total length within a given form factor is typically 60 to 70% less than for a comparable single reel cassette, however, has hampered its acceptance in high end professional systems focusing on maximum capacity.

Figure 3:
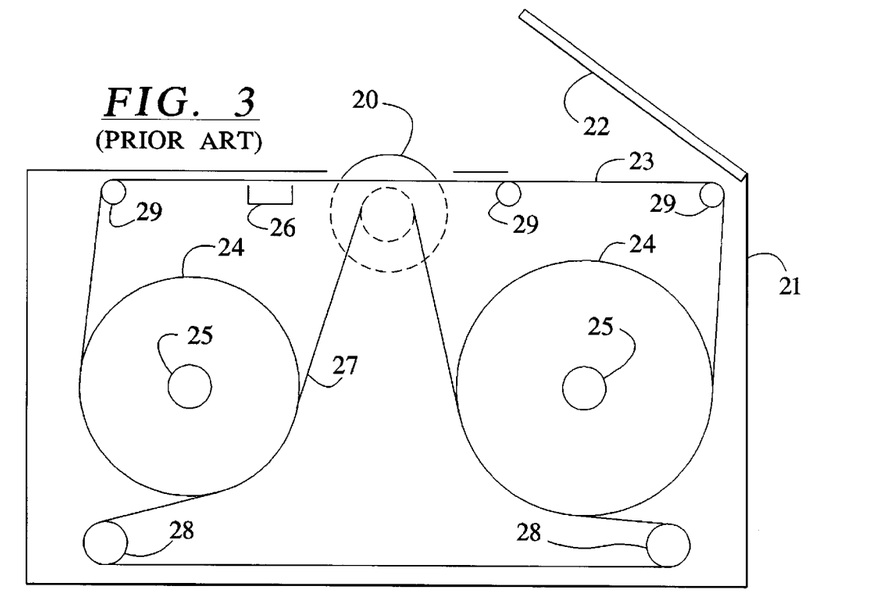
FIG. 3 is a schematic illustration showing the basic structure of a conventional belt-driven dual reel cassette, having fixed-position axles.

The belt driven cassette is a variant of the dual reel cassette. The most widely used version is the QIC (quarter inch cartridge) and its smaller companion, the Travan cartridge. FIG. 3 shows the basic principle of a conventional QIC cartridge. A drive puck 20 engages the capstan motor in the tape drive when the cartridge is loaded into the drive. The cartridge housing 21, a door 22 which opens during insertion to expose a portion of the tape 23, which is wound in tape packs 24 on respective hubs 25. A mirror 26 detects special holes at the beginning and end of the tape. A belt 28 is entrained around the drive puck 20 and friction rollers 28, and is in contact with both tape packs 24. When the drive motor rotates the drive puck 20, the belt 28 causes the tape 23 to be moved in a straight path defined by guide pins 29.

Compared to a dual reel cassette, the belt driven QIC cartridge is designed so that it is only necessary to use one motor driving the cartridge reels at one point (the drive puck 20 in FIG. 3). That can simplify the drive construction even further. Like the dual reel cassette, however, the belt driven QIC cartridge has the same limitations with respect to available tape length. Actually, because the belt driven cartridge typically needs to have some additional components (belt guides etc.) inside its housing, the available tape length may be less than for a similar dual reel cassette design.

SUMMARY OF THE INVENTION

An object of the present invention is to provide a special form of a dual reel cassette which is as simple to utilize in a tape drive as normal dual reel cassettes, while containing significantly more tape media than a regular dual cassette having the same foam factor.

This object is achieved in accordance with the principles of the present invention in an apparatus for storing a continuous tape medium in reeled form having a housing containing a continuous tape medium and two tape hubs respectively rotatably mounted on axles, so that the tape medium can be transferred (wound and unwound) between the hubs, and wherein the axles are mounted in the housing so as to allow translational movement of the axles in tandem in a direction parallel to a base or a top of the housing, as the tape medium is transferred between the hubs.

By mounting the hub axles in this manner, the maximum space occupied by the tape medium on the hubs (which occurs when an equal amount of tape medium is present on each of the hubs) is mathematically minimized. Since the various cassette or cartridge housing formats have standardized dimensions, in order to allow them to interact with other standardized components, such as tape drives, the interior size and volume within the housing is fixed. By minimizing the amount of space which is occupied by the tape contained in the housing on the hubs, in accordance with the invention, a significantly larger amount (length) of tape can be accommodated in standardized housings than was heretofore possible. In a dual reel cassette format, having a standardized wall-to-wall longest dimension of 100 mm, in accordance with the invention 900 feet of tape medium can be accommodated in such a housing, wound on the two hubs therein. This represents a 49% increase in tape length over a conventionally constructed cassette of the same size. In a so-called quadrature dual reel cassette, having a diagonal (corner-to-corner) dimension of 141 mm, 1,448 feet of tape can be accommodated in such a housing in accordance with the invention. This represents a 79% increase in the length of tape accommodated in such a housing, compared to a conventional housing having this standardized format.

The axles on which the two hubs are respectively mounted are both rotationally mounted on a platform. The platform is disposed in an opening in, for example, the bottom of the cassette housing. The opening is substantially the same width as the platform, but is longer in length, so that the platform can slide along the length (longest dimension) of the opening. Such sliding can be permitted, for example, by a tongue-and-groove engagement between the sides of the platform and the sides of the opening. As tape is unwound from one of the hubs and wound onto the other hub, and thus the diameter of the tape reel on one hub decreases while the diameter of the tape reel on the other hub increases, the platform slides within the opening to accommodate these changing diameters. In conventionally designed cassettes and cartridges, because the axles on which the hubs rotate are mounted at fixed positions within the housing, it was always necessary to space the fixed-position hub axle at a distance from the closest housing sidewall so as to leave space for a fully-loaded reel of tape between the axle and the sidewall. In accordance with the invention, due to the mounting of the axles on a platform which undergoes a translational movement parallel to the housing base during winding and unwinding, the maximum spacing which must be maintained between the axles and the respective sidewalls is that distance which is necessary to accommodate the maximum combined space which will be occupied by the two tape reels. This maximum occurs when an equal amount of tape is on each hub. Otherwise, the platform automatically slides within the opening, by means of suitable biasing, in a direction toward the sidewall closest to the hub having the lower diameter of tape reeled thereon. The platform thus automatically moves away from the sidewall closest to the hub having the largest diameter of tape reeled thereon, thereby increasing the spacing between that hub's axle and the closest sidewall, so as to accommodate the increasing diameter of tape being reeled onto that hub.

DESCRIPTION OF THE PREFERRED EMBODIMENTS

Figure 4A:
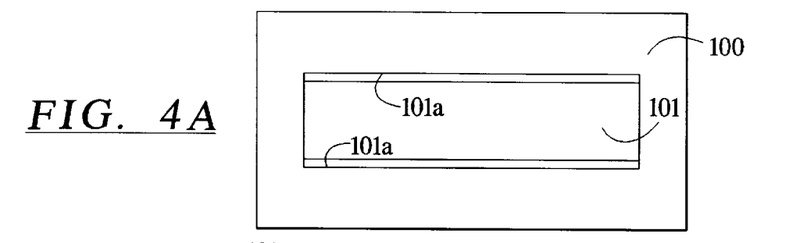
FIG. 4A is a view from above of a base of a cassette housing constructed in accordance with the principles of the present invention.
Figure 4B:
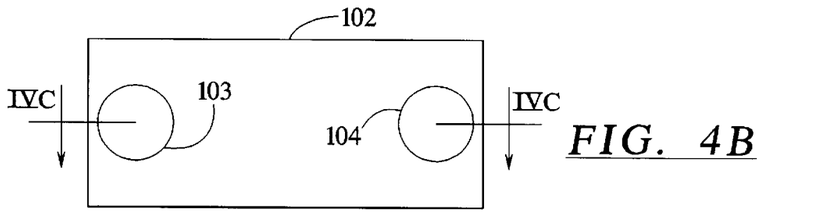
FIG. 4B is a view from above of a platform insertable into the housing base shown in FIG. 4A in accordance with the invention.

The basic structure of the inventive cassette is shown in FIGS. 4A through 4D. At the bottom of the cassette housing 100 (see FIG. 4A) is a rectangular opening 101. A platform 102 is inserted into this opening. The platform contains two tape reel hubs 103 and 104 as shown in FIG. 4B. The tape shall be wound on these two hubs.

Figure 4C:
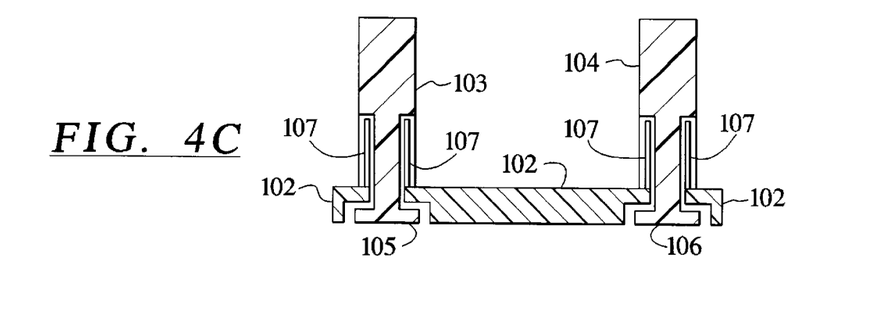
FIG. 4C is a sectional view taken along line IVC—IVC in FIG. 4B.

FIG. 4C shows the design of the platform and the hubs in more detail, seen from the long side. The two hubs 103 and 104 rotate around two tubular guides 107 mounted onto the platform 102. Each of the tape hubs 103 and 104 has an internal pin or axle which extends through its tube guide 107 and through a hole at the bottom of the platform. At the bottom, this internal axle or pin is connected to a hub disk 105 or 106. By rotating a hub disk at the bottom of the platform 102, the corresponding hub will rotate on the other side of the platform 102.

Figure 4D:
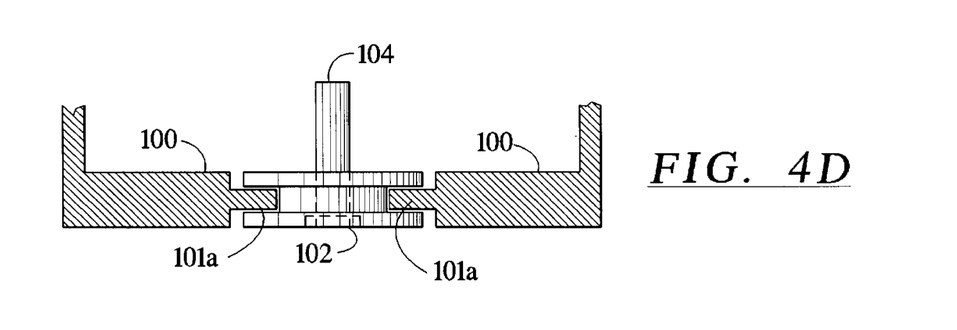
FIG. 4D is a sectional view showing the platform of FIG. 4B inserted in the base of FIG. 4A, in accordance with the invention.

The platform 102 is designed so that it can be inserted into the opening 101 in the cassette housing. The width of the platform 102 and the width of the opening 101 are almost the same (just a small difference to allow for tolerance variations), while the length of the platform 102 is shorter than the length of the opening 101. The two longer sides of the platform 102 and the two longer sides of the cassette bottom along the opening 101 are designed so that the platform 102 can slide within the opening, as shown in FIG. 4D.

For this purpose, each of the long sides of opening 101 has a tongue 101a which mates in a groove in the platform 102 (of course, the tongues could be on the platform 102 and the grooves in the sides of the opening 101).

Figure 4E:
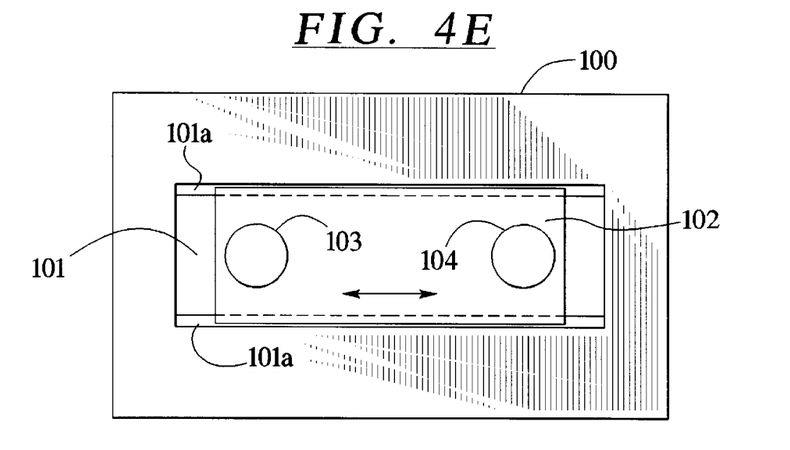
FIGS. 4E, 4F and 4G respectively show various sliding positions of the platform of FIG. 4B in the base of FIG. 4A, in accordance with the invention.
Figure 4F:
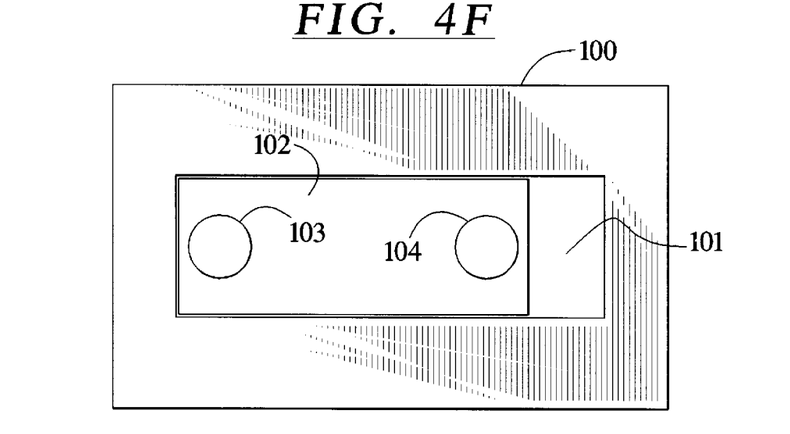
Figure 4G:
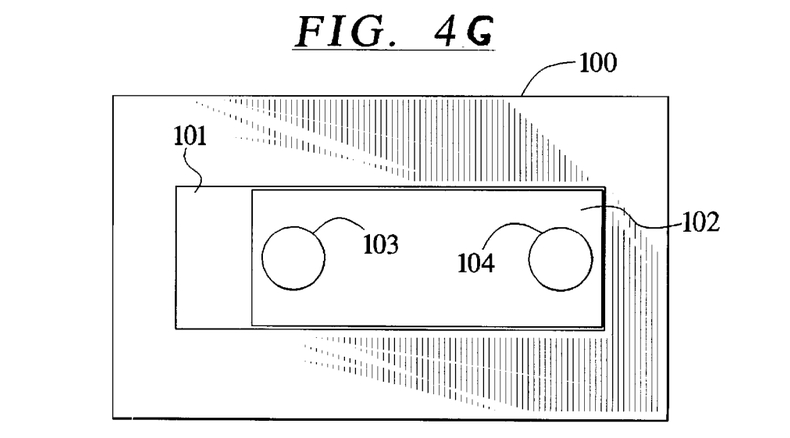

FIG. 4E (with the tongues 101a omitted for simplicity, as in FIGS. 4F and 4G as well) shows the cassette housing 100 with the platform 102 inserted into the opening 101. As indicated by the arrows, the platform 102 is designed so that it can easily slide from one side to the other within the opening 101. FIG. 4F shows the cassette with the platform 102 slid all the way to the left, while FIG. 4G shows the platform 102 positioned all the way to the right (within the opening 101).

Figure 5:
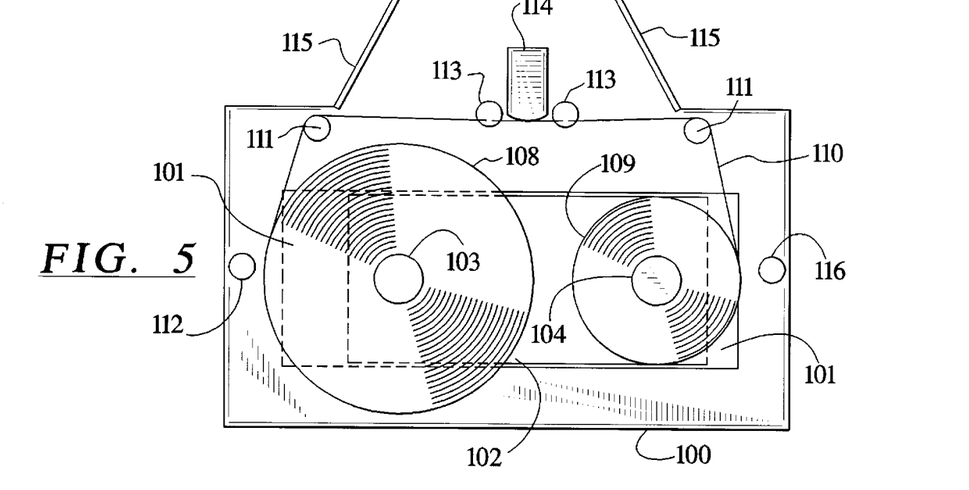
FIG. 5 is a view from above showing the basic components of a complete cassette constructed in accordance with the principles of the present invention.

FIG. 5 shows the cassette with tape and loaded into a tape drive. The platform 102 with the hubs 103 and 104 now has tape on the hubs. Tape reel 108 is wound on hub 103 while tape reel 109 wound on hub 104. FIG. 5 shows more tape on hub 103 than on hub 104. The tape 110 goes from one reel (for example 108) to the other reel (109). The cassette housing contains two guiding pins 111. Two roller pins 112 and 116 are vertically mounted respectively on the left and right sidewalls.

When inserted into a tape drive, a door 115 at the front of the cartridge opens. FIG. 5 shows one way of constructing such a door system by having either one or (as in the figure) two sections of the front end cassette wall swing away during insertion. Another way of designing such a door opening can be to use a flexible strip covering the front section of the cassette. This strip is then pulled back (along the sidewalls of the cassette), as the cassette is inserted into the drive, thereby exposing the front opening of the cassette.

When inserted in a drive, two tape guides 113 mounted in the drive at each side of the head engage with the tape and keep it at a stable position. The head 114 mounted in the drive also engages the tape, and read and write operations can be performed.

When the cassette is inserted into the drive, two drive motors (not shown) respectively engage the hub disks 105 and 106 (FIG. 4C). These motors move the tape from one hub to the other.

FIG. 5 shows the cassette loaded with almost all the tape on the left hub 103. The corresponding tape reel 108 is pressing toward the left side roller pin 112, thereby moving the hub platform 102 to the right in the opening 101 of the cassette house.

Figure 6A:
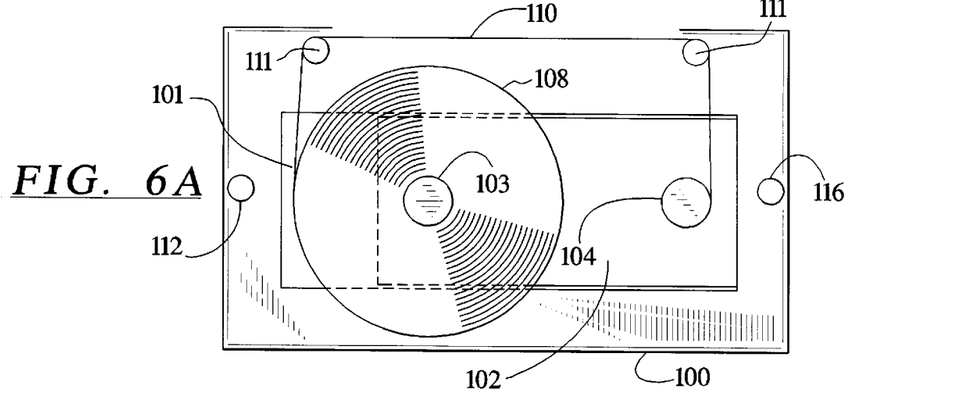
FIGS. 6A, 6B and 6C show various positions of the sliding platform in the cassette of FIG. 5, as tape is transferred between the hubs.
Figure 6B:
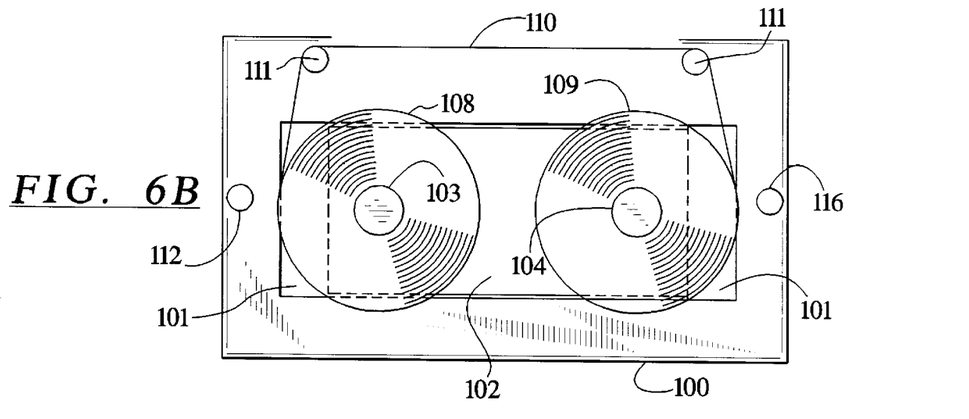
Figure 6C:
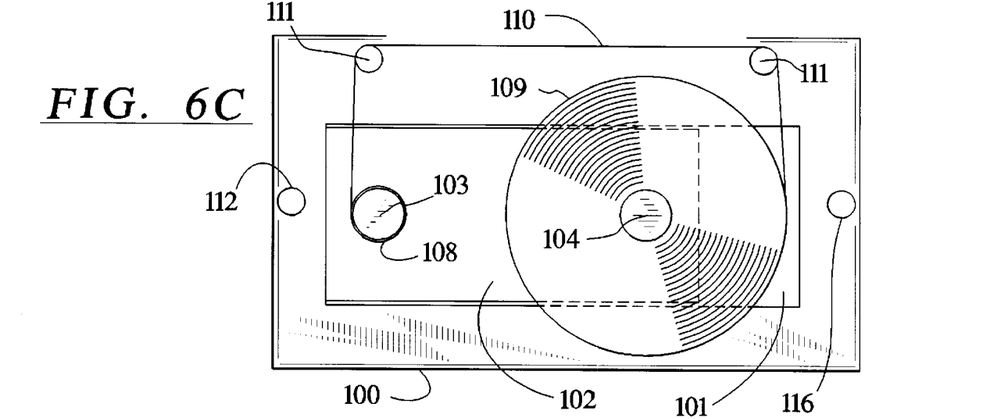

The principle of the operation is shown in FIGS. 6A, 6B and 6C. These figures are somewhat simplified from FIG. 5 in that the head, the head guides and the door(s) are not shown to make the drawings simpler to understand.

Assume that the left tape hub 103 contains a full tape reel and the right hub 104 is empty. This is shown in FIG. 6A. The platform 102 is positioned all the way to the right in the opening 101 in the cassette housing 100. The left tape reel 108 is touching the left side wall roller 112 while the right tape reel is almost touching the right side wall roller 116.

When the cassette is inserted in the tape drive, the drive mechanism (the drive motor(s)) engages the two hub disks 105 and 106 (ref. FIG. 4C), at the bottom of the cassette housing 100, and thereby can move the tape from one reel to the other. As the tape is moved from the left tape reel to the right, the diameter of the left reel 108 diminishes and the right tape reel 109 increases in diameter. The right tape reel 109 will press on the side wall roller 116. As this happens, the cassette housing 100 starts moving from left to right relative to the hub platform 102. (See FIG. 6B).

When all the tape has become unwound from the left reel on to the right reel, the cassette housing 100 has moved all the way to right relative to the hub platform. This is shown in FIG. 6C.

By using this sliding platform 102 which holds the tape, the available area within the tape housing can be utilized better than in conventional designs. Therefore with this design, the width of the cassette housing (the distance between the two sidewalls) can be made shorter than in a conventional dual reel tape cassette with fixed hub positions relative to the cassette housing, or more tape can be loaded into a cassette with fixed dimensions compared to the conventional design with fixed hubs.

The goal is to get maximum tape length within a given cassette housing. To accommodate this, it is necessary to develop some basic formulae as follows.

A. Minimum reel hub to reel hub distance D:

The minimum distance required between the two reel hubs is calculated so that the tape on the two reels never touch as the tape is running from one reel to the other. This minimum distance will vary depending upon how much tape has unwound from the supply reel and wound up on the take-up reel. It is therefore necessary to find the point where the radius of the supply reel plus the radius of the take-up reel is at maximum. In the following, this distance is called D.

Figure 7:
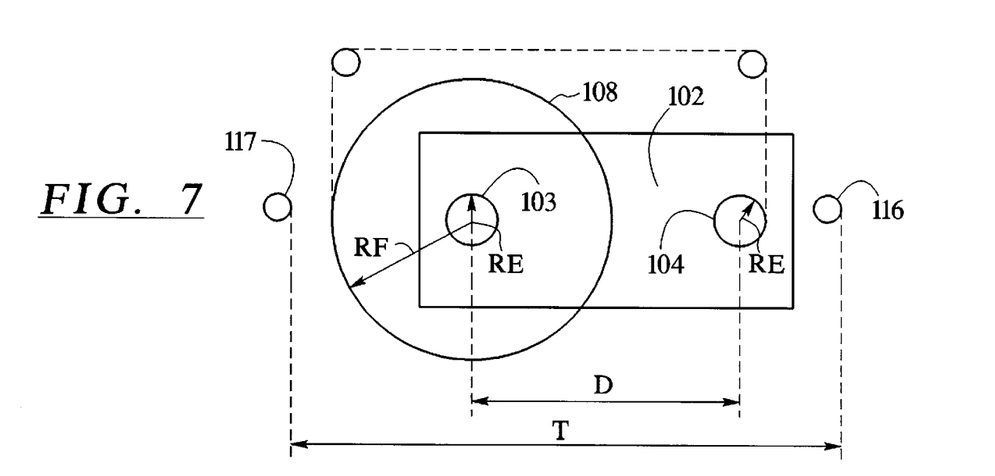
FIG. 7 is a schematic illustration for use in conjunction with a mathematical analysis of the improvement in tape length achievable in accordance with the invention.

Assume that each hub with no tape has a radius $R_E$. Furthermore, assume that when the a reel hub is completely filled with tape (the entire tape length on one reel) the radius of this reel is $R_F$. (See FIG. 7. As seen from the dotted line in FIG. 7, there must of course be a connection of tape from the full reel (supply reel) to the empty one (take-up reel), but for these calculation, this is completely negligible. FIG. 7 is simplified compared with FIG. 5 as parts which are not critical for the calculations are not shown.)

The area of the tape top on the supply reel (the area covered with tape as seen from the top of the reel) is given by:

$$A = \pi \cdot R_F^2 - \pi \cdot R_E^2 = \pi \cdot (R_F^2 - R_E^2).$$

As the tape is moving from the supply reel to the take-up reel, the total diameter of the supply reel is gradually reduced and the total diameter of the take-up reel is gradually increasing. The distance required between the two hubs to avoid the two reels touching each other increases until there is an equal length of tape on both reels. (One simple way to see that this is correct is as follows: When the tape starts moving from the full reel to the empty one, the total diameter of the empty one is increasing faster than the total diameter of the full supply reel is being reduced. This situation will continue until there is equal amount of tape on both hubs. Thereafter, the diameter of the original supply reel will be reduced faster than the diameter of the original take-up reel will increase. Therefore, this point must represent the required minimum distance between the two hubs.)

This can also be seen by looking at the symmetry of the design: The necessary maximum distance can occur only at one point or tape position. If this were a point which was not midway between the two tape ends, then there would be two points which should represent this distance. Due to the symmetrical nature of the design, there can only be one maximum point, and therefore this has to be at the middle point of the tape.

When the tape loaded equally on both hubs, we assume that the total radius of each of the two hubs is designated r. Since half of the tape is on one hub or reel and the other half is on the other reel, the following applies:

$$A/2 = \pi \cdot r^2 - \pi \cdot R_E^2 = \pi \cdot (r^2 - R_E^2) = 0.5 \cdot \pi \cdot (R_F^2 - R_E^2).$$

which gives $$r^2 = \tfrac{1}{2} \cdot (R_E^2 + R_F^2).$$

Therefore, the absolute minimum distance between the two hubs (in order to avoid that the tape reel touch each other) is $$D = 2r = \sqrt{2} \cdot \sqrt{(R_E^2 + R_F^2)}. \tag{1}$$

(In practical design, the minimum distance must be made slightly bigger so as to have some safety margin.)

B. Minimum distance between side walls, T:

Given the symmetry of the cassette design, the minimum distance T in FIG. 7 between the two side wall rollers (109 and 110) must be 2D=4r:

$$T = 2D = 2\sqrt{2} \cdot \sqrt{(R_E^2 + R_F^2)} \tag{2}$$

Without the invention, T would have been given by:

$$T_{old} = 2R_F + \sqrt{2} \cdot \sqrt{(R_E^2 + R_F^2)} \tag{3}$$

C: Tape length "L" and the number of turns "n":

To see how much improvement (measured in increased tape length) is gained from the invention, it is necessary to know how much tape can be loaded onto one of the hubs. In the following calculations, parameters L, n, t, $R_E$ and $R_F$ are defined as follows:

L = total tape length n = number of tape turns on a hub for a full hub $R_E$ = radius of empty reel or hub $R_F$ = total radius of full reel (tape plus empty hub)

t = total tape thickness

If n, $R_E$, $R_F$ and t are known, the length of the tape can be calculated as follows:

$$L=2\pi \cdot R_e+2\pi \cdot (R_e+t)+2\pi \cdot (R_e+2t)+ \ldots 2\pi \cdot (R_e+(n-1)t)$$

which gives:

$$L=2\pi \cdot n \cdot R_E+2\pi \cdot (1+2+3+4+5+ \ldots (n-1)) \cdot t$$

$$L=2\pi \cdot n \cdot R_E+2\pi \cdot (n-1)t \cdot n/2$$

$$L=2\pi n\, R_E+\pi(n-1)tn \qquad (4)$$

For n>>1, the formulae can be simplified as follows:

$$L=2\pi n\, R_E+\pi tn^2 \quad (n>>1)$$

Expression (4) assumes that the tape can be packed properly on the reels without any air between the layers. In reality, there will be some air and packing tolerances which will lower the tape length somewhat. This will vary from cassette type to cassette type depending upon the tape itself, tape tension, speed and speed control etc. For this invention analysis, Expression (4) will be used since it is not relevant to bring in the variations in tape length due to tolerances and properties not connected with the present invention. Furthermore:

$$R_F=(R_E+nt)$$

which gives $$n=(R_F-R_E)/t \qquad (5)$$

$$R_E=R_F-nt$$

Inserted into (4), the tape length L is:

$$L=2\pi(nR_F-n^2t)+\pi(n-1)tn=-\pi n^2t+2\pi nR_F-\pi tn$$

$$L=2R_F\pi n-\pi n^2 t-t\pi n=2R_F\pi n-\pi tn(n-1) \qquad (6)$$

Since n>>1, this formulae can be simplified to $$L=2R_F\pi n-\pi n^2 t \qquad (7)$$

Using these expressions, it is now possible to compare how much improvement is gained by the invention.

Figure 8:
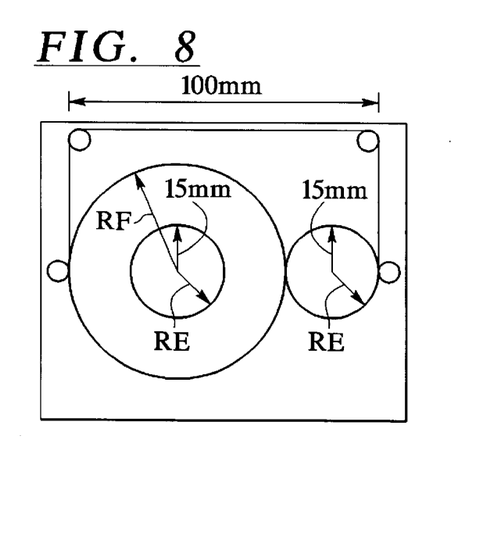
FIG. 8 shows one standardized cassette housing format in which the present invention can be used.

As an example, assume a rectangular cassette having a net inside distance between two of the walls of 100 mm and a distance between the two other walls of at least 70 mm, as shown in FIG. 8. Furthermore, assume that the minimum hub radius (without tape) is 15 mm. Using (2), the maximum radius is calculated as follows:

$$T=2\sqrt{2}\cdot\sqrt{(R_E^2+R_F^2)}=100=2\sqrt{2}\cdot\sqrt{(15^2+R_F^2)}$$

Solved for $R_F$ this gives $R_F$ equal to approximately 32 mm.

(This calculation assumes that the diameters of the side rollers are negligible. In reality, the side rollers will reduce the maximum possible diameter somewhat, however, it can be minimized, as shown later).

For a cartridge without the inventive structure, the maximum possible diameter $R_F$ of a full hub can be calculated according to (3):

$$T_{old}=2R_F+\sqrt{2}\cdot\sqrt{(R_E^2+R_F^2)}=100=2R_F+\sqrt{2}\cdot\sqrt{(15^2+R_F^2)}.$$

Solved for $R_F$ this gives $R_f$ equal to approximately 27.7 mm.

In the context of available improvements, this is a substantial increase in tape length.

Since both $R_E$ and $R_F$ are known, the number of tape turns can be calculated if the tape thickness is known. Assuming a tape thickness of 9.144 µm, (5) is used to calculate the number of turns when all tape is on one hub:

$$n=(R_F-R_E)/t$$

For $R_F$=32 mm, n is 1859.
For $R_F$=27.7 mm, n is 1389.
Using (6) the maximum tape length is calculated:
$L_{32}$=274 meters or 900 feet for $R_F$=32 mm. and
$L_{27}$=186 meters or 611 feet for $R_F$=27.7 mm.

Therefore, the invention makes it possible to get 47% more tape inside a cassette compared with the same cassette without using the invention.

Figure 9:
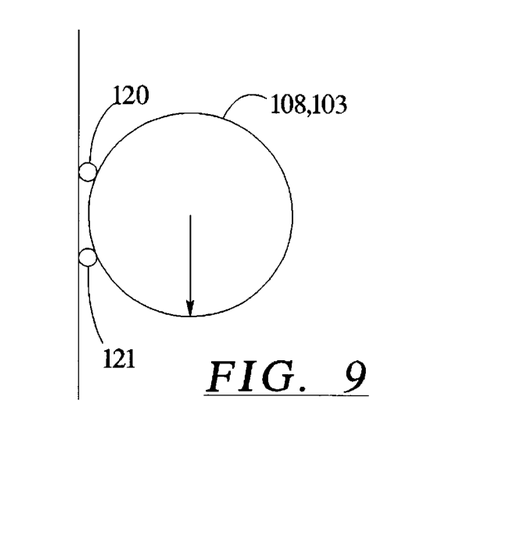
FIG. 9 illustrates an alternative manner of accommodating the tape reels in a standardized housing format of the type shown in FIG. 8.

While the side wall rollers 112 and 116 in FIG. 5 are intended to have a small diameter, they still take up valuable space within the cassette housing. FIG. 9 shows a solution with a double set of rollers 120 at each wall side, mounted to maximize the available space for the tape on the hubs.

Figure 10:
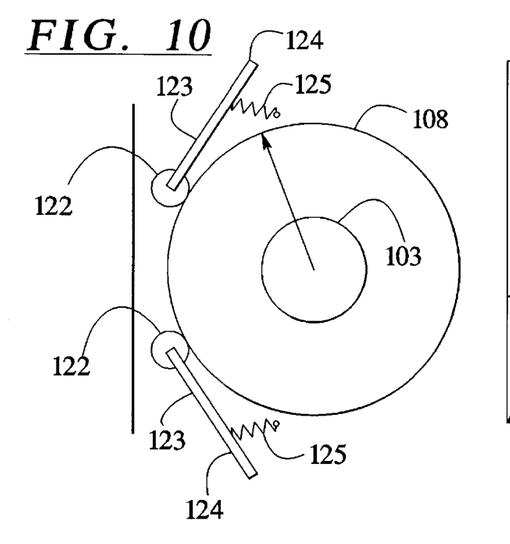
FIG. 10 shows a further version of a manner for accommodating the tape reels in a standardized housing of the type shown in FIG. 8.

Depending upon the cassette design, it may be desirable to have the side wall rollers mounted so they can move and follow the outer surface area of each of the tape reels. One way to do this is shown in FIG. 10. The rollers 120 are each mounted on an arm which can pivot around a pin 124. The arm is hooked to a spring 125 so that the rollers 122 constantly press on the tape reel 108 to keep it tight.

In the higher end of the tape storage market, single reel cassettes having quadratic or almost quadratic housings have gained popularity. Typical examples are the DLT and 3490 cassettes.

As mentioned earlier, such a single reel cassette will always have the maximum available tape length for any specific cassette housing, although the inner hub diameter typically has to be made somewhat larger, thereby reducing the maximum tape length somewhat (compared to theoretical maximum). Nevertheless, single reel cassettes do have long tape length and typically have a very simple inner structure which makes it possible to reduce the cassette cost. Single reel cassettes, however, require a more complex drive mechanism, and the average time to access data will be longer than for systems using cassettes with dual reels or hubs. Furthermore, drives using dual reel cassettes can be designed so that it is fairly simple to release the cassette and remove it from the drive in case of power loss. Single reel cassettes will normally have some tape loaded inside the drive, and it is impossible or at least very cumbersome to remove the cassette from the drive if power fails.

Since cassettes like DLT and 3490 have gained so much popularity, there are many library and automatic cassette handling systems designed for such cassettes. Therefore, it is desirable to design a dual reel cassette based on the inventive structure to be used inside such a quadratic housing.

The actual tape length for a single reel cassette will obviously vary with design, tape parameters etc. For a DLT cassette used in the DLT7000 drive series the tape thickness is 9.144 µm. The inner radius $R_E$ is approximately 21 mm and the outer is approximately 45.5 mm. This gives the number of turns to 2679 according to (5) and the tape length to 1828 feet.

The inner wall-to-wall distance of the DLT cassette is close to 100 mm. Therefore, the example given earlier (ref.

FIG. 7) of a two hub cassette design with inner wall-to-wall distance of 100 mm will be relevant also if such a design were embodied in the housing of a DLT-like cassette. (Note that a single reel cassette typically needs a larger hub design (larger diameter) to achieve the necessary stability).

Figure 11:
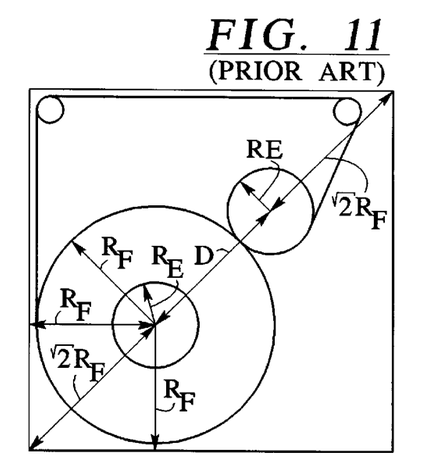
FIG. 11 shows a conventional standardized quadratic cassette housing, with fixed-position axles for the tape hubs.
Figure 12:
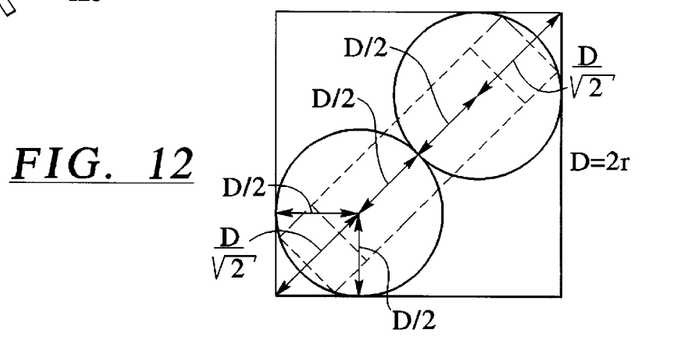
FIG. 12 is a schematic illustration showing the incorporation of the invention in a standarized quadratic cassette housing.

It is possible in accordance with the invention to modify the dual hub design within a DLT-form of cassette housing to better utilize the available inner area. This is shown in FIG. 11 and FIG. 12. FIG. 11 is a design with fixed hubs. FIG. 12 is a design with the invention.

As shown in FIG. 11, the total length of the diagonal line is given by the following expressions::

$$T=\sqrt{2}R_F+D+\sqrt{2}R_F=D+2\sqrt{2}R_F \text{ where D is given by (1).}$$

$$T=\sqrt{2}\cdot\sqrt{(R_E^2+R_F^2)}+2\sqrt{2}R_F$$

Assuming $R_E$=15 mm, $R_F$ is then approximately 32 mm. Compared with the straight line across the side walls, fixed hub solution, this diagonally placement of the hubs increases the tape length assuming the same tape thickness to 912 feet or 278 meters.

Implementing the invention with this design allows for even more tape. Since the maximum worst case distance requirement occurs when there is equal amount of tape on both reels, the total length of the diagonal T can be found from FIG. 12 as follows:

$$T=D/\sqrt{2}+D+D/\sqrt{2}=D(1+\sqrt{2})$$

where D=2r is given by formulae (1). As before, r is the radius of the tape reel when there is an equal amount of tape on both hubs.

$$T=(1+\sqrt{2})\cdot\sqrt{2}\cdot\sqrt{(R_E^2+R_F^2)}$$

Assuming $R_E$=15 mm, $R_F$ is then approximately 38.6 mm in the embodiment of FIG. 12. Assuming the same tape thickness as before, the number of turns is 2622 and the available tape length is 441 meters or 1448 feet. Therefore, it is possible to make a chart as shown in Table 1 for the various options assuming the use of DLT-like housing.

Figure 13A:
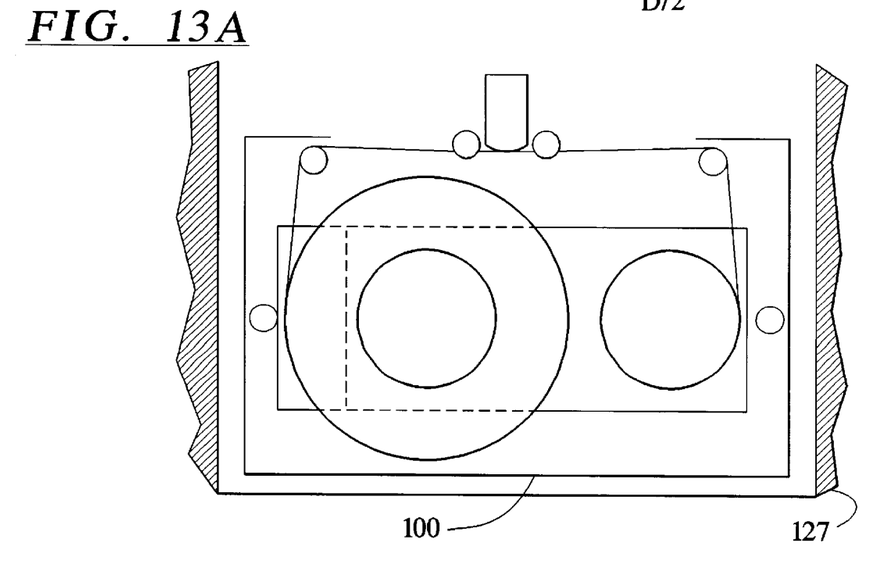
FIGS. 13A and 13B show a cassette constructed in accordance with the principles of the present invention inserted in a tape drive, with the platform respectively in opposite extreme positions.
Figure 13B:
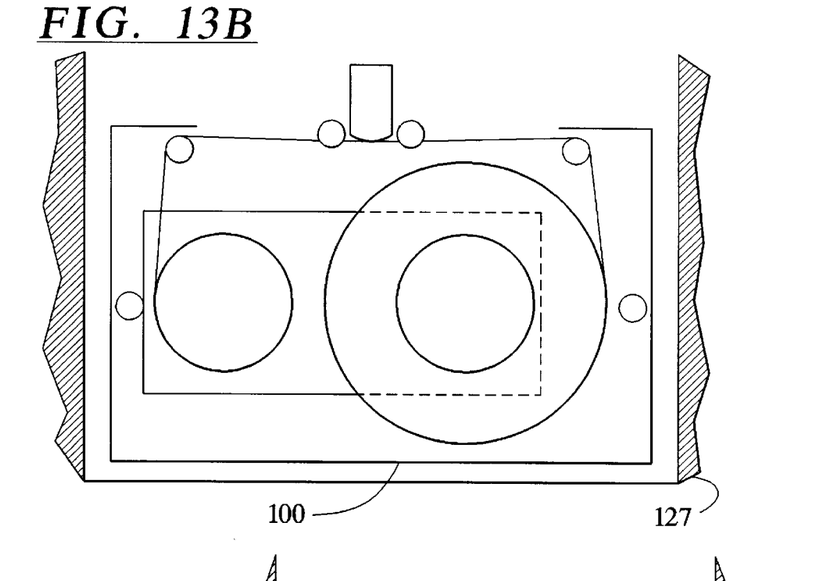

FIGS. 4 through 12 (excluding FIG. 11) show various options for implementing the invention. As already mentioned, if a cassette with basically quadratic housing is employed, the embodiment of FIG. 12 is very efficient. A non-quadratic solution may be based upon the design shown in FIGS. 5 and 6. When inserted in the drive, the cassette housing will move across the width of the tape drive as shown in FIGS. 13A and 13B. The drive 127 holds the cassette house completely inside the sidewalls with enough room for the cassette house to move within the drive as the tape moves from being all on the left reel (FIG. 13A) to being all on the right reel (FIG. 13B).

Figure 14:
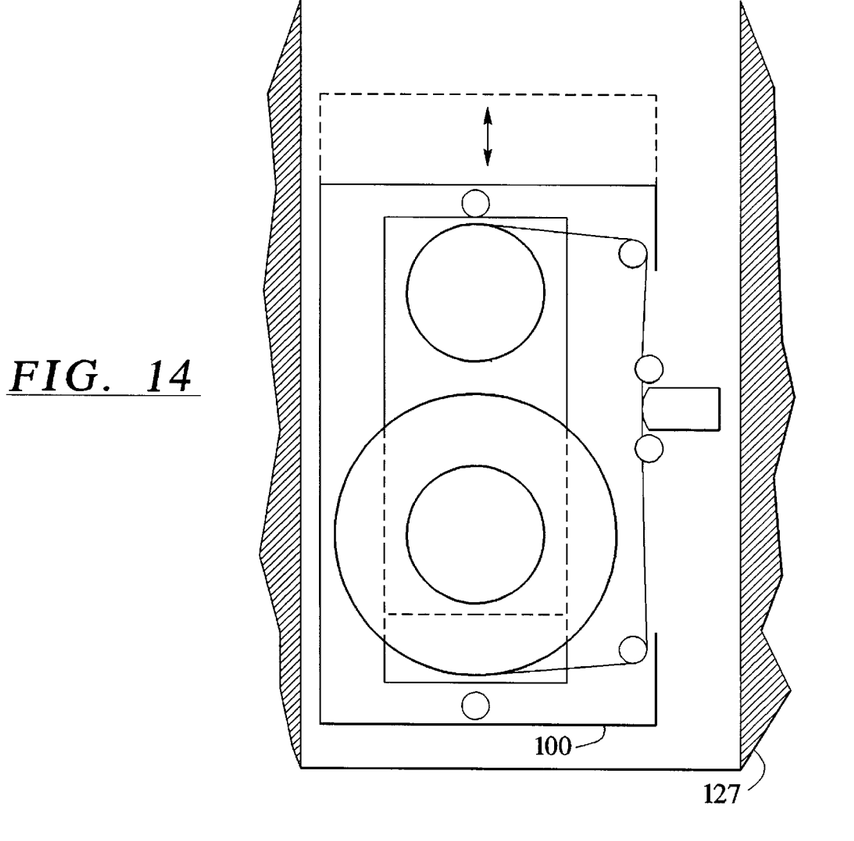
FIG. 14 shows a cassette constructed in accordance with the principles of the present invention inserted in a different orientation in a tape drive from FIGS. 13A and 13B.

For some drive designs, however, it may be more desirable to have a design wherein the movement is along the length of the tape drive. This can easily be achieved by inserting the cassette in FIG. 13 sideways so that the head is mounted along one side of the drive. FIG. 14 shows the basic principle, assuming that the cassette housing is moving while the platform with the hubs is fixed.

The version shown in FIG. 14, however, is not very practical for small form factor tape drives, since it requires the head to be mounted along one side, and the loading and engaging of the head to the tape is more difficult.

Therefore, it may be desirable to modify the design so that the cassette housing is fixed and the plate with the hub is moving in the direction of the length of the drive. This will make it possible to keep the front of the cassette opening fixed, making the interface between the cassette and the head system in the drive more reliable. Such a design requires a somewhat more complex drive motor design, however, since the motors now must be designed to move with the tape. By mounting the drive motors on a spring loaded plate which also can move in the same direction as the platform with the hubs, such a drive principle may be implemented.

Figure 15:
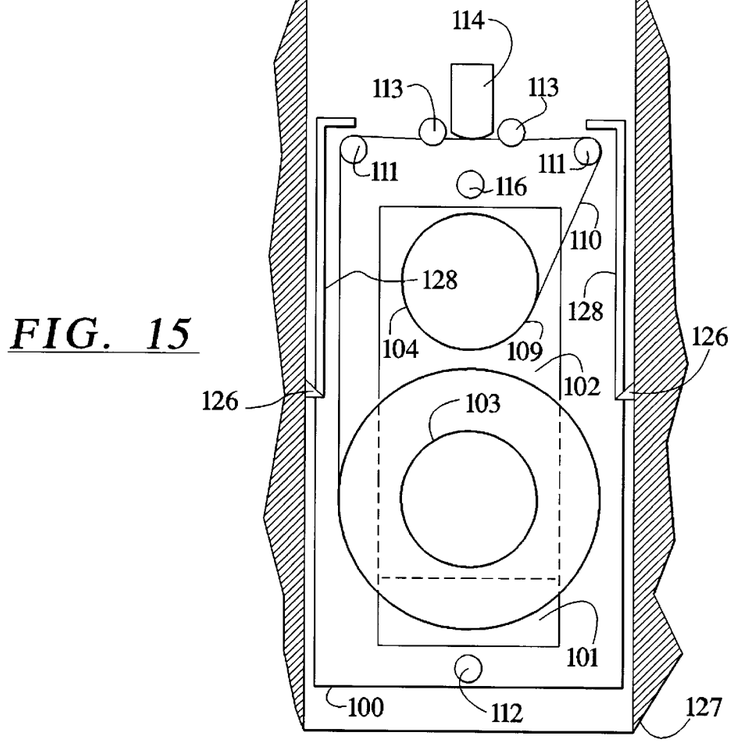
FIG. 15 shows one embodiment of doors on a cassette housing constructed in accordance with the principles of the present invention.

FIG. 15 shows the basic design of a cassette made for this kind of operation. The cassette housing 100 is locked to the drive 127 when inserted. For this design, a system with two sliding doors 128 is shown. The sliding doors 128 are pulled back by knobs 126 on the side walls of the drive during insertion. (The sliding doors 128 must be spring-loaded so that they go back to the front of the cassette housing 100 when the cassette is removed from the drive. For simplicity, such springs are not shown in FIG. 15).

When fully inserted, the front of the cassette housing 100 is open, exposing the tape. Two tape guides 113, perma-

|  | Single reel cassette, 100 mm housing | | Dual reel fixed, with 100 mm wall to wall utilization | | Dual reel fixed with diagonal 141 mm corner to corner utilization | | Dual reel with invention, using 100 mm wall to wall utilization | | Dual reel with invention, using 141 mm corner to corner utilization | |
| --- | --- | --- | --- | --- | --- | --- | --- | --- | --- | --- |
|  | Tape length | Rel % | Tape length | Rel % | Tape length | Rel % | Tape length | Rel % | Tape length | Rel. % |
| Tape length in feet and relative to single reel cassette | 1828 feet | 100 0% | 611 feet | 33% | 912 feet | 50% | 900 feet | 49% | 1448 feet | 79% |

Table 1 compares possible maximum tape length in a square cartridge with 100 mm inner wall-to-wall distance.

In the previous embodiments the sliding direction of the platform 102 is substantially parallel to the direction of tape transport; in the embodiment of FIG. 12 the sliding direction is oriented at approximately 45° relative to the tape transport directions (along the two sides of the quadratic housing).

nently mounted in the drive and the drive head 114, engage the tape. Additionally, during insertion, the drive tape movement mechanism (typically two motors) engage the hub disks at the bottom of the cassette (ref. FIG. 4C). As already mentioned, the mechanism which moves the tape must be mounted so that it can easily slide in the same direction in/out as the platform 102 in the cassette.

As before, tape hubs 103 and 104 are mounted on to the platform 102 which can slide in the cassette opening 101. Tape 110 moves between tape reels 108 and 109. Tape guiding pins 111 ensure proper positioning of the tape to the front of the cassette at all times. The vertical rollers 112 and 116 guide the platform 102 inwardly or outwardly depending upon the direction of the tape movement.

This design therefore allows a very simple and stable interface between the tape and the head in the drive.

Depending upon the desired length and width of the cassette, the two hubs 103 and 104 may be placed in the direction of the length of the drive as shown in FIG. 15 or they may be placed slightly offset from each other to allow for better utilization of the available area within the cassette housing.

As mentioned earlier, the DLT cassette is very popular in the professional segments of the market. Therefore, there are many automatic handling systems (libraries and autoloaders) designed for this cassette. By using a cassette with the same width as a DLT cassette, but somewhat longer (or deeper), it is possible to utilize several of these automatic handling systems with some simple modifications. Therefore, in the following example, it is assumed that the inner width of the cassette housing (the inner side wall to side wall distance) is 100 mm (which is very close to a DLT cassette). The length of the cassette housing will vary depending upon the actual design. The design in FIG. 15 assumes that the area required for the length (depth) of the two reels is given by (2):

$$T = 2D = 2\sqrt{2} \cdot \sqrt{(R_E^2 + R_F^2)} \qquad (2)$$

Since the assumed distance between the side walls is 100 mm, the maximum diameter of a full reel must be slightly less. Although the diameter will depend upon the actual construction, in this example, the maximum diameter $R_F$ is set to:

$$R_F = 45 \text{ mm}.$$

As in other examples $R_E$ is set to 15 mm.
Using (2), the length of the area needed by the tape reel is $$T = 134 \text{ mm}.$$

As shown in FIG. 15, the total cassette needs to be somewhat longer in order to make room for the tape guiding pins 111, etc.

Assuming a tape thickness of 9.144 μm, the number of tape turns can be calculated by using (5):

$$n = (R_F - R_E)/t$$

With the numbers assumed, this gives $$n = 3280$$

Using (6), the total tape length can be calculated:

$$L = 2R_F \pi n - \pi n^2 t - t \pi n \qquad (6)$$

With the numbers assumed, this gives $$L = 618 \text{ meters or } 2028 \text{ feet of tape}.$$

In addition to the examples presented herein, there are numerous other ways to implement the basic principles of this invention, by varying the dimensions and positions of the tape hubs and reels compared to the cassette housing.

Figure 16A:
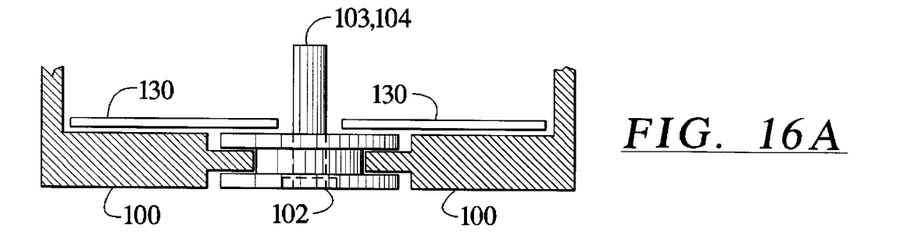
FIGS. 16A and 16B respectively show a side view and a plan view, of a plate for covering openings in the base of the cassette housing in a cassette constructed in accordance with the principles of the present invention.
Figure 16B:
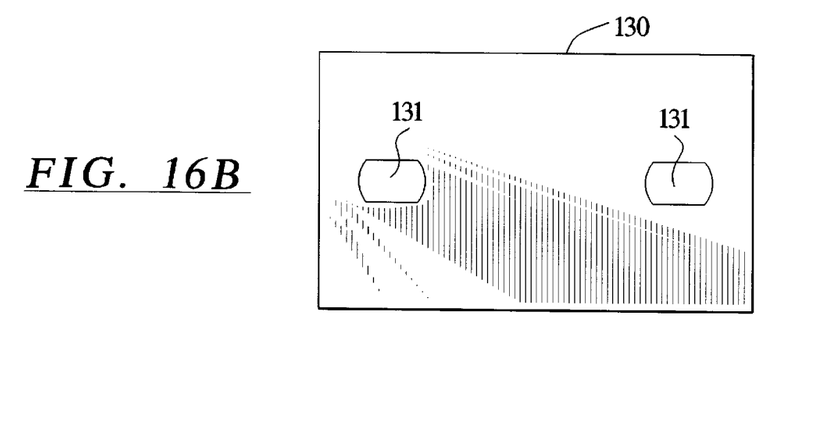

Since the invention assumes that the hubs have only very small or no flanges holding the tape pack, it may be desirable to have a material with very smooth surface on each side of the tape packs on which the tape can glide. This can be achieved by, for example, a very smooth plastic cover plate on each side of the tape packs (at the cassette house bottom and below the cassette house ceiling.) These gliding cover plates need to have openings where the tape reel hubs can slide. FIG. 16A shows how this can be implemented (FIG. 16A shows the bottom design, but the same principle can also be use for the plate above the tape reels.) At the inside bottom of the cassette housing 100 a very smooth cover plate 130 (for example made of plastic or metal) is placed so that it covers the cassette bottom including the sliding platform 102 holding the tape hubs. There are openings 131 in the cover plate 130 (see FIG. 16B which sees the cover plate from above) where the hubs may slide. The tape packs will then glide on the smooth surface of the cover plate 130 during operation.

In all of the above embodiments, the two hubs on which the tape is wound are mounted in the housing so as to be translationally movable, in tandem, in a direction parallel to the housing bottom (or top) as tape is transferred between the hubs.

Figure 17:
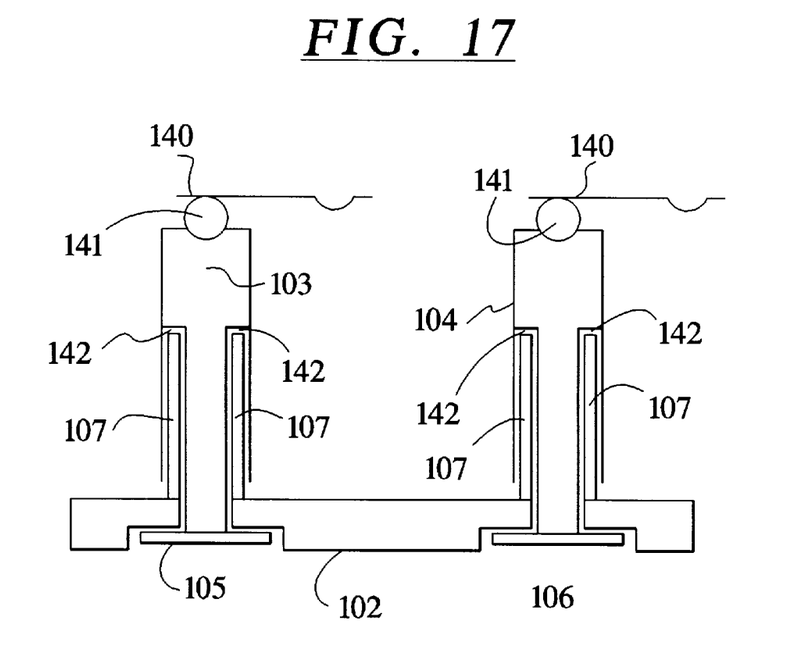
FIG. 17 shows a portion of a cassette constructed in accordance with the principles of the present invention in an embodiment for providing locking of the tape hubs when the cassette is not inserted into a tape drive.

The design of the tape reel hubs mounted on the sliding plate can be done in many different ways. FIG. 4C shows one principle as already mentioned. For some applications, it may be important to ensure proper locking of the tape hubs (tape reels) when the cassette is not inserted into the tape drive. FIG. 17 shows one way to achieve this based upon the design shown in FIG. 4C. A small ball 140 (made of steel or other strong material) lies on the top of each of the tape hubs 103 and 104 and each ball 140 is pressed against the tape hubs by springs 140. When the cassette is not loaded in a drive, the spring 140 will press the tape hubs down toward the top of the tubular guide 107. The top of this guide and the inside of the tape hub touching it may be provided with a series of small teeth 142 so that it effectively prevents the hub from rotating when the cassette is not loaded into a drive.

The spring 140 may either be placed under the top cover or it may be made as an integrated part of the platform 102 assembly.

When the cassette is inserted in a drive, the drive hub motors engage the hub disk plate and press this upwards. This will press the whole tape hub upwards and the hub can then more freely (controlled by the motor).

Figure 18:
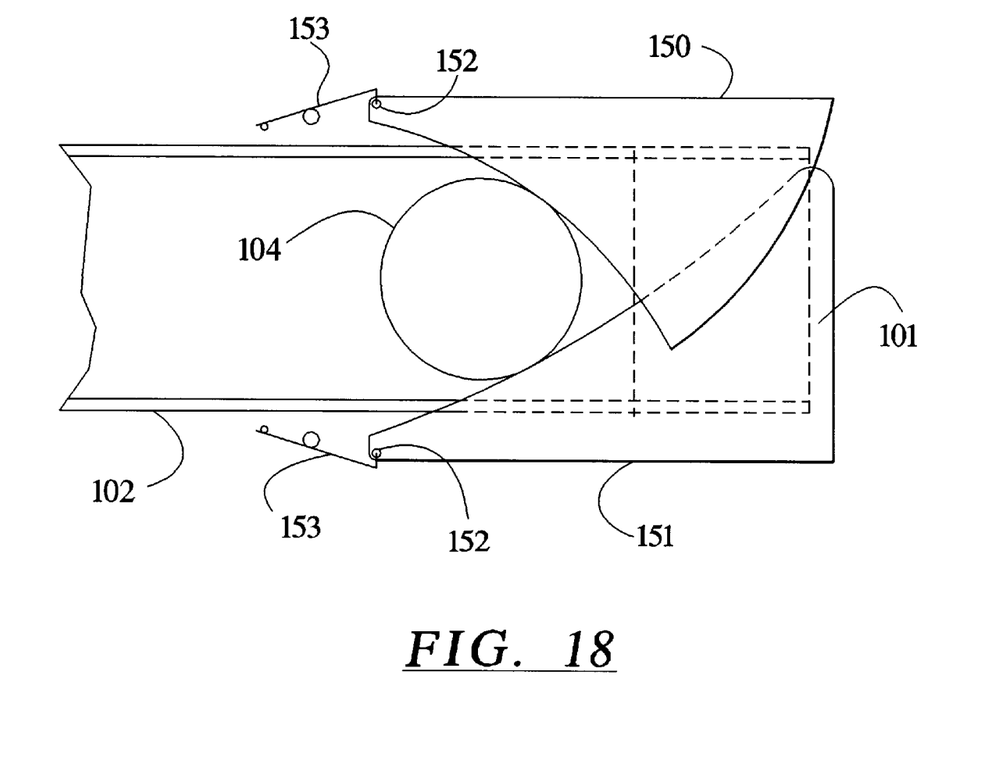
FIG. 18 shows a movable blade embodiment for automatically closing the opening in the base plate of a cassette housing constructed in accordance with the principles of the present invention.

Even with the use of the cover plate 130 there will be openings at the bottom of the cassette where the platform 102 is not covering the opening 101 (see FIG. 5). it is possible to cover these openings at each end of the platform by thin spring-loaded plates or blades as shown in FIG. 18. Here the two blades 150 and 151 can pivot around pin 152. Both blades are spring-loaded by springs 153. As the platform 102 moves from right to left, the two blades 150 and 151 close and cover the exposed part of the opening 101. Moving the platform 102 toward right from left, the blades 150 and 151 open to allow the platform 102 to move into the right side of the opening 101. A mirror-symmetric blade arrangement is disposed at the other end of the platform 102. If the plate 130 is used, the structure shown in FIG. 18 can be disposed between the plate 130 and the bottom of the housing 100.

Although other modifications and changes may be suggested by those skilled in the art, it is the intention of the inventor to embody within the patent warranted hereon all changes and modifications as reasonably and properly come within the scope of his contribution to the art.

We claim as our invention:

1. An apparatus for storing a continuous tape medium in reeled form, comprising:

a housing having a base;

a continuous tape medium having a first end and a second end;

a first tape hub disposed in said housing adjacent said first end of said continuous tape medium;

a first axle on which said first tape hub is mounted allowing rotation of said first tape hub;

a second tape hub disposed in said housing adjacent said second end of said continuous tape medium;

a second axle on which said second tape hub is mounted allowing rotation of said second tape hub, said continuous tape medium being wound in respective portions on said first tape hun and said second tape hub; and means for mounting said first and second axles in said housing allowing translational movement of said first and second axles in tandem parallel to said base, as said tape medium is transferred between said first and second tape hubs upon rotation of said first and second tape hubs, said means for mounting said first and second axles in said housing comprising an opening in said base having first and second parallel opening walls disposed opposite each other, and said opening having a length substantially equal to a length of said parallel opening walls, a platform on which said first and second axles are mounted, said platform having first and second parallel platform walls disposed opposite each other, said platform having a length substantially equal to a length of said parallel platform walls, said length of said platform being less than said length of said opening, and means for slideably engaging said parallel platform walls with said parallel opening walls for allowing said platform, with said first and second axles thereon, to slide within said opening along said length of said opening.

2. An apparatus as claimed in claim 1 further comprising means for temporarily restraining rotation of said first and second tape hubs respectively on said first and second axles.

3. An apparatus as claimed in claim 1 wherein said means for slideably engaging comprises a tongue-and-groove engagement.

4. An apparatus as claimed in claim 3 wherein said tongue-and-groove arrangement comprises first and second tongues respectively projecting from said parallel opening walls and first and second grooves respectively in said parallel platform walls, said first groove receiving said first tongue and said second groove receiving said second tongue.

5. An apparatus as claimed in claim 1 wherein said housing and said base are rectangular.

6. An apparatus as claimed in claim 1 wherein said housing and said base are quadratic.

7. An apparatus as claimed in claim 1 wherein said housing comprises parallel sidewalls disposed opposite each other, said first and second tape hubs, said first and second axles, said continuous tape medium and said means for mounting being disposed between said sidewalls, and wherein said means for mounting comprises biasing means for urging said first and second axles in tandem, as said tape medium is transferred between said first and second hubs, toward the sidewall closest to whichever of said first and second tape hubs has a smaller portion of said continuous tape medium reeled thereon.

8. An apparatus as claimed in claim 1 wherein said tape medium is transferred in a transfer direction between said first and second tape hubs, and wherein said means for mounting comprises means for mounting said first and second axles in said housing allowing translational movement of said first and second axles substantially parallel to said tape transfer direction.

9. An apparatus as claimed in claim 1 wherein said tape medium is transferred in a transfer direction between said first and second hubs, and wherein said means for mounting comprises means for mounting said first and second axles in said housing allowing translational movement of said first and second axles in a direction at an angle of substantially 45° relative to said tape transfer direction.

10. An apparatus as claimed in claim 1 further comprising a cover plate, disposed in said housing over said base, having openings therein through which said first and second axles respectively project and move as said means for mounting executes said translational movement, said cover plate covering said opening in said base.

11. An apparatus as claimed in claim 1 wherein said opening has parallel ends disposed opposite each other between said parallel opening walls, and said apparatus further comprising, at each of said ends, first and second blades rotatably mounted at a common pivot point on said base, bias means for normally urging said blades toward each other to cover a portion of said opening, said blades being disposed in a path of said translational movement and said blades being spread apart by one of said axles as said means for mounting executes said translational movement.

* * * * *